(No Model.)
J. J. DEVINE.
MEANS FOR VENTILATING ELECTRIC MOTORS ON CARS.
No. 538,325. Patented Apr. 30, 1895.
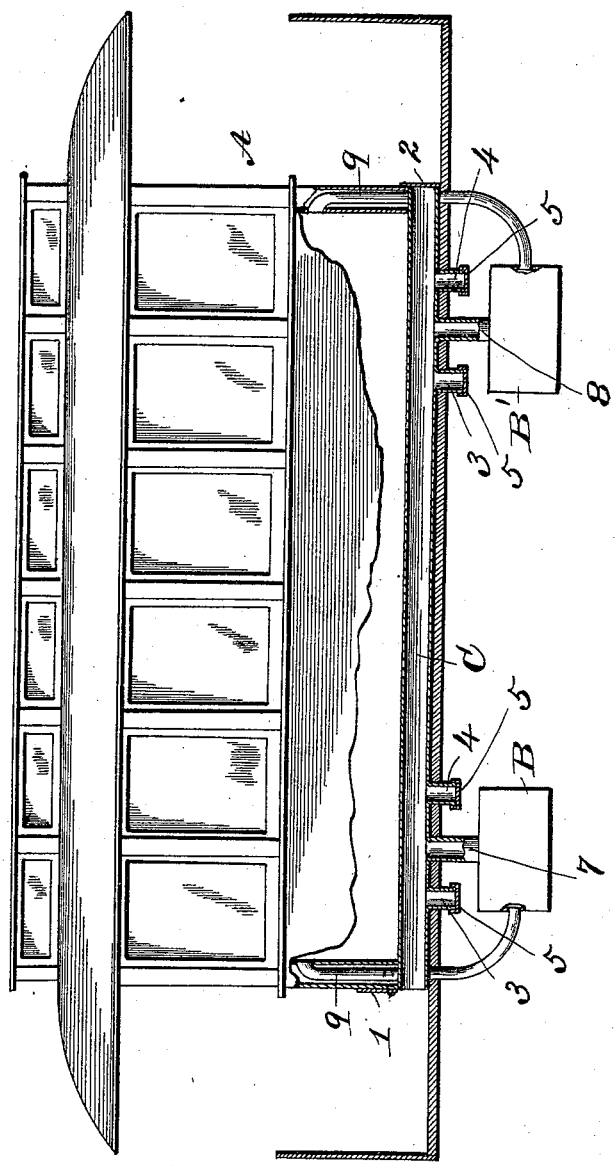
Witnesses
Inventor
James J. Devine
By A. G. Heymann
Attorney.

UNITED STATES PATENT OFFICE.

JAMES J. DEVINE, OF CLIFTON HEIGHTS, PENNSYLVANIA.

MEANS FOR VENTILATING ELECTRIC MOTORS ON CARS.

SPECIFICATION forming part of Letters Patent No. 538,325, dated April 30, 1895.

Application filed March 14, 1895. Serial No. 541,724. (No model.)

*To all whom it may concern:*

Be it known that I, JAMES J. DEVINE, a citizen of the United States of America, residing at Clifton Heights, in the county of Delaware and State of Pennsylvania, have invented a new and useful Improvement in Means for Ventilating Electrical Motors on Cars, of which the following is a specification.

My invention has relation to means for carrying or conducting the heat from the motor boxes to the open air as will be hereinafter more fully described and particularly pointed out in the claims.

I have fully and clearly illustrated my invention in the accompanying drawing, wherein is shown my device applied to a street car operated by electrical motors.

It is the object of my device to provide a conduit attached to the motor boxes so that the heat generated by the electricity in the motors may be taken to the outer atmosphere without inconvenience to the occupants of the car. To accomplish this I attach to the lid of the motor-box a flexible connection constituting a conduit for the currents created by the armatures and connect this conduit to a larger conduit, substantially as shown in the drawing.

Referring to the drawing, A designates a passenger car, which may be of any of the usual and approved constructions.

B, B' designate the motor boxes of the usual construction in use upon an electrically propelled car. It is not deemed necessary or essential to a proper and legal presentation of my invention to illustrate the motors or mechanism usually carried or concealed in these boxes, because these elements constitute no part of my invention.

C, designates an india rubber pipe mounted under the seat of the car and extending the length thereof, substantially as shown in the drawing, and having the ends closed by means of caps 1, 2, which may be opened, as convenience in the direction of the motion of the car, demands, that end or cap being closed which is in the direction of the motion of the car, the other end being open to permit the currents generated or created by the revolution of the armatures to have exit at the rear open end. In order that the dust or other débris cast up by the action of the armatures may be taken from the pipe, I attach to the pipe short projections 3, 4, located on each side of the flexible conduit leading to the motor boxes and on the projections I fit removable caps 5, 6, which may be taken off of the projection, and the deposits allowed to fall from the pipe. In the lids of the motor boxes are formed apertures of the desired size to which are connected the lower ends of the flexible conduits 7, 8, the other ends of these conduits being formed integral with the pipe or connected thereto by any suitable and proper fastening.

It will be observed by reference to the drawing in connection with the foregoing description that the air currents generated by the action of the armatures in the motor boxes will find exit through the conduits in connection with the lids of the motor boxes and thence into the main pipe and finally be discharged at the open end thereof, thus removing the heat from the motor boxes and saving them from being so rapidly burned out as they are liable, when sealed with a lid providing no exit for the constantly increasing heat. The heat in an ordinary box is confined therein and causes undue expansion and even melting of material, but by the means of my invention this heat is readily conveyed to the open air and the boxes kept cool, and at the same time the dust and heat are conveyed through the conduit out at the open end thereof. Opening into the motor-boxes, at each end of the car, is a pipe 9, the upper end of which opens into the car, as shown. These pipes 9, 9, serve to draw air from the car and deliver it to the motor-boxes.

Having thus described my invention, what I claim, and desire to secure by Letters Patent, is—

1. The combination with the motor-box in an electrically propelled car, of a conduit arranged in the under part of the car and extending the length thereof, and provided at its ends with caps which may be opened and closed as desired, and flexible connections between the pipe and the lids of the motor-box and opening from the motor box into the main pipe, substantially as described.

2. In a motor car the combination of the conduit or pipe C, having caps 1, 2, on the ends thereof and formed with projections 3, 4, having caps to close them, flexible pipes 7, 8, opening into the motor boxes, and the motor-boxes provided with lids having apertures into which the flexible pipes open, substantially as and for the purpose specified.

3. In a motor-car the combination of the conduit or pipe C having caps 1, 2, on the ends thereof and formed with projections 3, 4, having caps to close them, flexible pipes opening into the motor boxes, motor-boxes provided with lids having apertures into which the said pipes open, and air-conducting pipes 9, 9, at the ends of the car, substantially as and for the purpose set forth.

In witness whereof I have hereto set my hand in the presence of two attesting witnesses.

JAMES J. DEVINE.

Attest:
GEO. I. BUTLER,
FRANK B. RHODES.